United States Patent [19]

Stadnick et al.

[11] Patent Number: 4,689,544
[45] Date of Patent: Aug. 25, 1987

[54] CONTROL OF THE CHARGING OF PRESSURIZED GAS-METAL ELECTRICAL STORAGE CELLS

[75] Inventors: Steven J. Stadnick, Redondo Beach; Howard H. Rogers, Torrance, both of Calif.

[73] Assignee: Hughes Aircraft Company, Los Angeles, Calif.

[21] Appl. No.: 788,593

[22] Filed: Oct. 17, 1985

[51] Int. Cl.$^4$ .............................................. H02J 7/04
[52] U.S. Cl. ......................................... 320/46; 320/48
[58] Field of Search ........................ 320/43, 46, 47, 48

[56] References Cited

U.S. PATENT DOCUMENTS

| | | | |
|---|---|---|---|
| 3,252,071 | 5/1966 | Plessis | 320/46 |
| 3,427,523 | 2/1969 | Howard et al. | 320/46 |
| 4,143,212 | 3/1979 | Ueno et al. | 320/48 |
| 4,207,514 | 6/1980 | Klein | 320/44 |

FOREIGN PATENT DOCUMENTS 2850489  5/1979  Fed. Rep. of Germany ........ 320/43

Primary Examiner—Patrick R. Salce
Assistant Examiner—Anita M. Ault
Attorney, Agent, or Firm—S. M. Mitchell; M. J. Meltzer; A. W. Karambelas

[57] ABSTRACT

A process and apparatus for controlling the charging of pressurized gas-metal cells such as nickel-hydrogen cells, to prevent detrimental overcharging, wherein the time rate of change of a battery gas pressure index is monitored as a control parameter. When the time rate of change of the index falls below a preselected value, charging is discontinued. The cell gas pressure index can be gas pressure itself, or a quantity which is responsive to, and depends upon gas pressure, such as the deformation of a cell component.

12 Claims, 6 Drawing Figures

CONTROL OF THE CHARGING OF PRESSURIZED GAS-METAL ELECTRICAL STORAGE CELLS

BACKGROUND OF THE INVENTION

This invention relates generally to pressurized gas-metal storage cells such as sealed nickel-hydrogen cells and, more particularly, to controlling the charging of such cells.

Rechargeable storage cells are electrochemical devices for storing an electrical charge and later delivering that charge as a useful current. A familiar example of the rechargeable storage cell is the lead-acid battery used in automobiles. Another type of cell having a greater electrical storage capacity per unit weight is the pressurized gas-metal storage cell, an important example of which is the nickel-hydrogen cell used in spacecraft applications. A nickel-hydrogen cell used in a satellite is typically periodically charged by electrical current produced by solar panels on the spacecraft, and then later discharged to supply electrical power, when the spacecraft is in shadow or the solar panels are otherwise unable to furnish electrical power.

The primary requirements of storage cells to be used in spacecraft are high energy capacity per unit weight of cell, reliability, and the ability to be recycled through many cycles of charging and discharging. Reliability and multiple cycle capability are influenced in part by the degree of charging of the cell. That is, it has been found that nickel-hydrogen cells tend to have a shorter life and greater incidence of failures if the cells are severely overcharged during the charging cycle.

It is therefore important to control the charging of pressurized gas-metal storage cells during charging, to optimize their long-life performance. It has been previously observed that the hydrogen partial pressure inside a sealed pressurized gas-metal storage cell at first increases linearly during charging, but that later some of the hydrogen combines with oxygen generated at the positive electrode as the cell nears its full charge. This observation has been used in controlling the charging of such cells by monitoring the value of pressure within the sealed cell. Unfortunately, the pressure corresponding with a particular degree of cell charging varies with age of the cell, temperature, and charging rate, as well as with the amount of electrical energy stored in the cell. Since spacecraft may be in orbit for a number of years with the storage cells constantly undergoing charge-discharge cycles, the value of gas pressure within the cell does not provide a fully reliable measure that can be used to control the charging of the cell.

There therefore exists a need for an improved approach to controlling the charging of pressurized gas-metal storage cells, which does not depend upon the value of the pressure of the gas within the sealed cell container. Such an approach should be dependable and reliable through many thousands of charge-discharge cycles. It should be compatible with existing cell designs, since the cells must be optimized for their electrical performance and weight, rather than control procedures, and should not add excessive weight or complexity to the storage cell. Desirably, the control procedure would allow the cells to be charged and discharged autonomously, without any outside contact such as intervention by a ground controller. The present invention fulfills this need, and further provides related advantages.

SUMMARY OF THE INVENTION

The present invention resides in a method and apparatus for controlling the charging of pressurized gas-metal cells, to prevent the detrimental overcharging of such cells. The approach allows the reproducible limitation of cell charging, without regard to the age, temperature, charging rate, or other parameters, within the normal operating limits of typical spacecraft operations. No significant modifications to the cell itself are required, and the decisional and control functions can be accomplished using either a small hardware controller or a digital computer to monitor the instrumentation of the cell. Control may be accomplished entirely without outside intervention, so that charging requires no contact with a ground computer or controller.

In accordance with the invention, a storage cell charging controller for use with a pressurized gas-metal storage cell comprises means for determining the rate of change of a cell gas pressure index with time, and means for discontinuing the charging of the cell when the rate of change falls and remains below a preselected value. The gas pressure index can be any quantity which responsively and functionally varies with the gas pressure within the storage cell, including the gas pressure itself or a responsive quantity such as the deformation of one of the cell components.

The rate of change of the cell pressure index can vary widely within a short period of time, even during slow charging of the cell. It is therefore important to filter out or otherwise avoid the adverse effects of the variation, to obtain a true measure of the rate of change of the gas pressure index with time.

The controller therefore desirably includes means for calculating an averaged value of the rate of change of the cell pressure index. The averaging may be accomplished in any appropriate manner, such as by averaging several successive values of the rate of change, or by obtaining two averaged values of the gas pressure index and then dividing by the average time between obtaining the values. Whatever approach is used, when the rate of change falls below the preselected value, then it is concluded that the cell is approaching a full charge, and charging is discontinued, except for a possible trickle charge to maintain the charged state.

In a most preferred approach, the cell gas pressure index is taken to be the deformation of the wall of the cell pressure vessel, as measured by a strain gauge or transducer mounted on the external wall of the pressure vessel. As the pressure within the vessel rises, the wall deforms, and the strain gauge measures this deformation as produced by the internal pressure. Because of random variation of the index, the measured value of the rate of change of the cell gas pressure index varies widely about at true value. It is therefore preferred to measure a plurality of values of the rate of change, as on the order of about 33 values in a two minute period, and then to average these values to derive a true, reliable value of the rate of change of the gas pressure index. If this average value falls below the preselected value, then it is concluded that the cell is fully charged within the operational error limits of this procedure, and the charging is discontinued. To insure consistency, the preferred controller requires that two or more consecutive values of the averaged value of the rate of change of the gas pressure index must be below the preselected level, to be certain that random variation has not caused an incorrect determination of full charging.

The calculations can be made either by fully dedicated hardware, by a digital computer, or by a combined device such as a microprocessor working from a read-only memory. All of the necessary hardware and support functions can be placed adjacent the cell so that control of charging does not require the intervention of a ground-based controller.

In another aspect of the invention, a process for preventing the detrimental overcharging of a pressured gas-metal cell being charged from a voltage source comprises determining the time rate of change of a cell gas pressure index, comparing the time rate of change with a preselected value, and discontinuing the charging of the cell when the time rate of change falls and remains below the preselected value. The various modifications and optimizations discussed previously in regard to the controller can also be applied to the process for preventing overcharging.

It will now be appreciated that the present invention represents an advance in the art of pressurized gas-metal storage cells, and particularly in the long-lifetime operation of such cells. Using the approach of the present invention, cell charging can be limited to optimal levels, without reliance upon assumptions about internal gas pressure, charging rate, or other features. When the cell approaches its optimum full charge, the rate of change of the cell gas pressure index is reduced, and this reduced rate of change triggers the termination of the charging operation. Charging may therefore be commenced from any level of discharge, without knowing the value of that discharge level. This capability is important, inasmuch as the charge/discharge cycles can vary significantly depending upon the orbital position, the sun angle, and other flight parameters. Variations in temperature of the cell, charge rate, and age have no direct effect on this approach based upon the time rate of change of the index, and therefore do not hamper the attaining of an accurate level of full charging. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
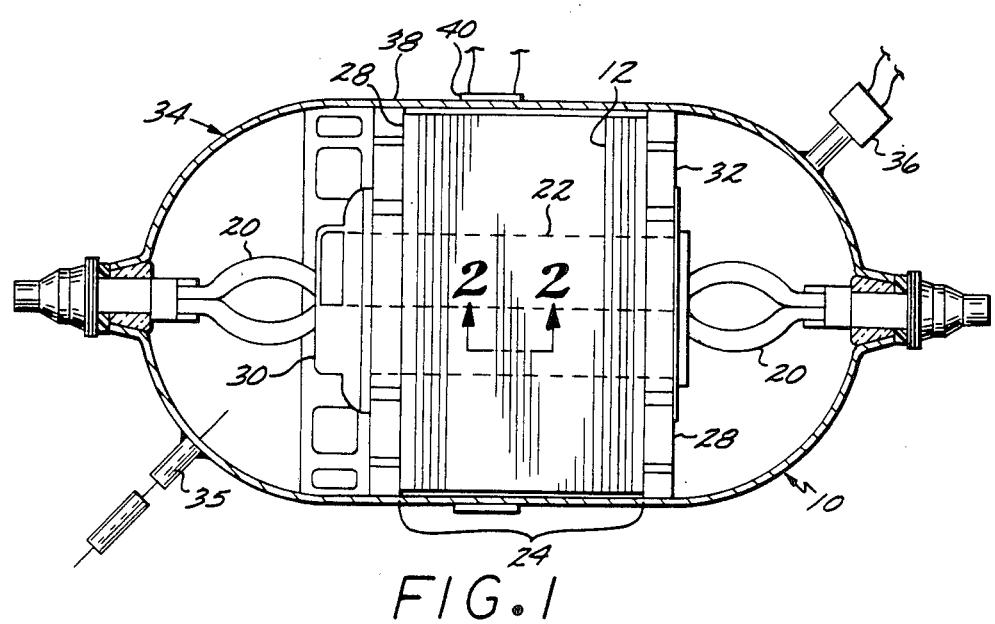
FIG. 1 is a sectional elevational view of a flight-type nickel-hydrogen cell.
Figure 2:
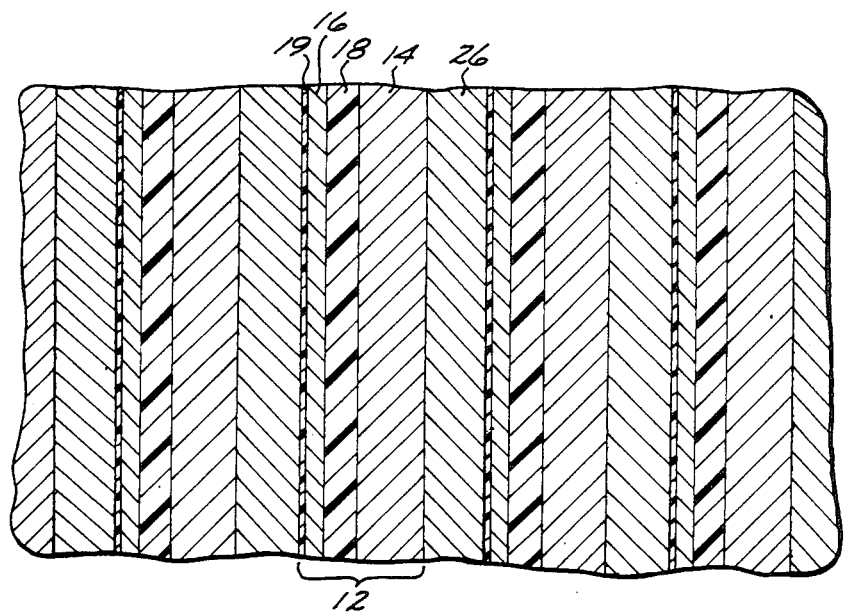
FIG. 2 is a detail of FIG. 1, taken generally on line 2—2, illustrating the plate sets.

The present invention is desirably used in conjunction with a nickel-hydrogen storage cell 10, as illustrated in FIGS. 1 and 2, of the pressurized gas-metal cell type. Such a cell 10 typically comprises a plurality of individual plate sets 12. Each plate set 12 in turn comprises an anode or positive electrode 14, a cathode or negative electrode 16, and an electrolyte-containing separator 18, which physically separates the electrodes 14 and 16, and also supplies the electrolyte medium through which ionic and electron transfer occur. Charging and discharging of the plate set 12 are accomplished through electrical leads 20.

Various constructions of nickel-hydrogen cells and components are disclosed in the following U.S. patents, whose disclosures are herein incorporated by reference: U.S. Pat. Nos. 4,369,212; 4,283,844; 4,262,061; 4,250,235; 4,000,350; and 3,669,744.

The positive electrode 14 is formed by impregnating nickel hydroxide into porous sintered nickel that is supported on an etched nickel electrode substrate. The negative electrode 16 is coated on one side by a sintered mixture of platinum black and polytetrafluoroethylene and on the other side with a porous layer of polytetrafluoroethylene 19. These layers are applied to a nickel substrate in the form of etched sheet or a woven mesh, to form the negative electrode 16. Many different types of separators 18 have been used, including, for example, asbestos, nylon, and a cloth of zirconium oxide-yttrium oxide containing polysulfone. The electrolyte, preferrably potassium hydroxide, is impregnated into the separator 18.

The individual plate sets 12 are assembled onto a central core 22 to form a stacked array 24. In forming the stacked array 24, a monofilament polypropylene screen 26 is placed between each plate set 12, so that oxygen liberated during overcharging at each positive electrode 14 can diffuse away from the electrode 14 and to the negative electrode 16 to combine with hydrogen. The stacked array 24 is placed under a longitudinal pressure of, for example, about 10 pounds per square inch, by tightening compression plates 28 against each end of the stacked array 24. The tightening of the compression plates 28 is preferably accomplished by compressing the array 24 and then tightening a nut 30 on threads on the core 22, thereby compressing a Belleville washer set 32 against the compression plate 28 to hold the stacked array 24 in place.

The stacked array 24 is sealed within a pressure vessel 34, manufactured of a material such as Inconel 718 nickel-based alloy which can withstand internal pressures on the order of 1,000 psi, without damage by hydrogen embrittlement or corrosion by the electrolyte. A gas fill tube 35 allows gas content and pressure within the pressure vessel 34 to be controlled. The pressure vessel 34 is typically constructed in the form of a cylindrical tube having domed ends. By way of illustration, the cell 10 having the pressure vessel 34 of external dimensions $3\frac{1}{2}$ inches diameter and 13 inches long can contain about 40 individual plate sets 12, with a resulting electrical storage capacity of the cell of about 50 ampere-hours. The cell 10 may be charged and discharged through thousands of cycles without apparent damage, if the charging and discharging are accomplished properly. A number of cells 10 can be combined in series or parallel to produce a battery.

Charging is accomplished by impressing a voltage through the leads 20 across each plate set 12 so that electrons flow from the electrode 16 to the electrode 14. Electrical energy is thereby stored in each plate set in the form of chemical reactants, for subsequent discharging to produce a usable current. A nickel-hydrogen cell of the type described previously may be fully charged by a solar cell array to a capacity of, for example, about 50 ampere hours, using a current of about 5 amperes at 1.5 volts, through a charging period of about 14 hours from a discharged state. The voltage and charging time vary, depending upon the power available from the solar cell and the cycle dictated by the orbit of the spacecraft.

As the nickel-hydrogen cell is charged, hydrogen is evolved, and the pressure within the sealed pressure vessel 34 increases. The rise in pressure may be measured directly by a pressure transducer 36, which measures the pressure within the pressure vessel 34. Alternatively, the rise in pressure may also be deduced by measuring a quantity which responds to pressure, specifically the deformation in the wall 38 of the pressure vessel 34. That is, as the pressure within the pressure vessel 34 increases, the pressure vessel tends to expand and bulge slightly. A strain gauge 40 fastened to the wall 38 of the pressure vessel 34 measures the bulging of the wall, which is a function of, and preferably proportional to, the internal gas pressure within the vessel 34. The pressure itself or a responsive quantity such as deformation of a cell component can be used as the gas pressure index.

Figure 3:
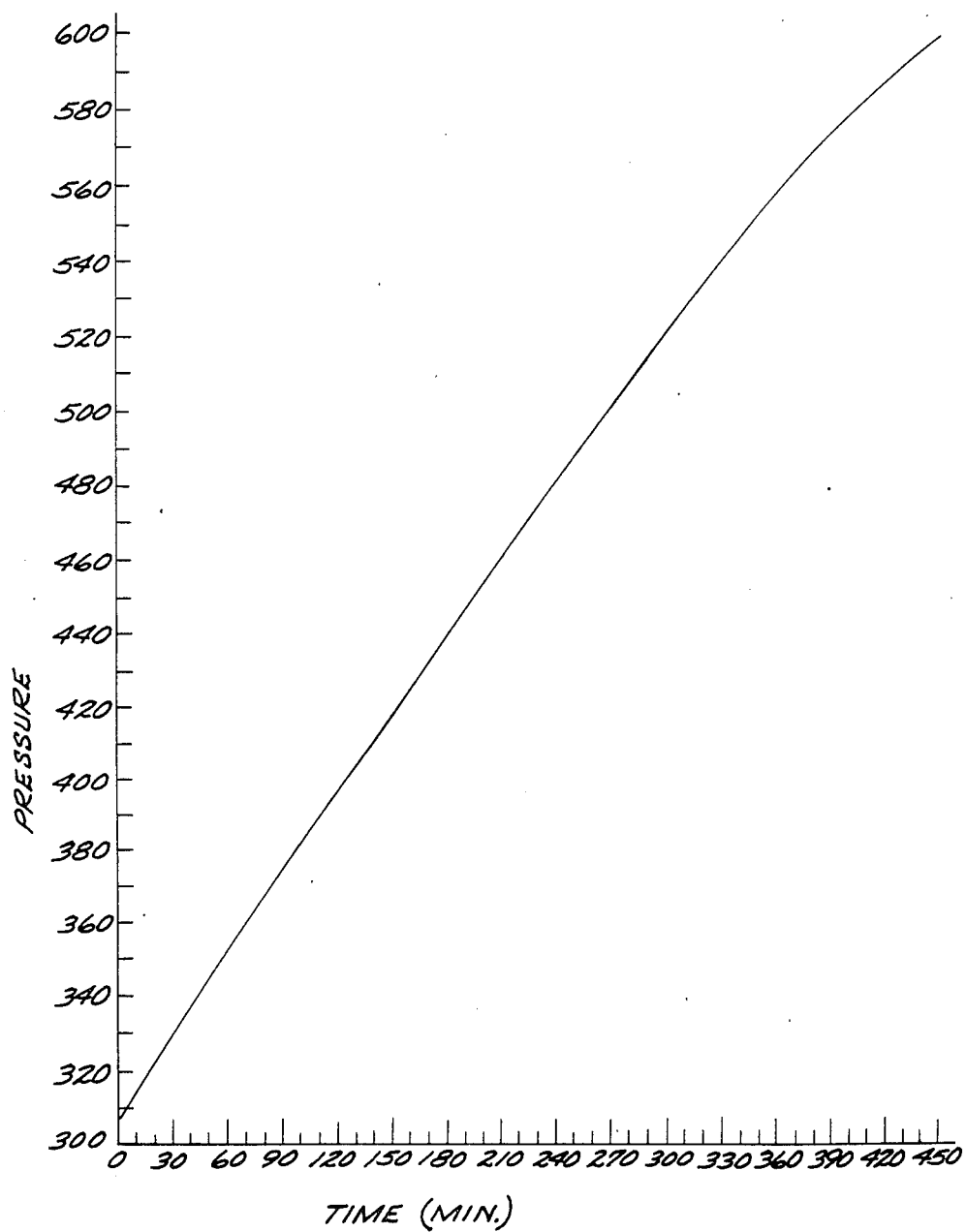
FIG. 3 is a graph of internal cell gas pressure as a function of time during charging of a cell.

FIG. 3 is a graph of the pressure in psig (pounds per square inch, gauge) actually measured within the pressure vessel 34 as a function of time during charging, for one set of charging condition. Charging was accomplished with a current of approximately 4.8 amperes, at voltages up to 1.5 volts. As may be seen in FIG. 3, the pressure varies approximately linearly with time until the pressure reaches approximately 520 psi. Thereafter, the pressure continues to rise but at a lesser rate, toward a value which reaches approximately 600 psi after 450 minutes.

Figure 4:
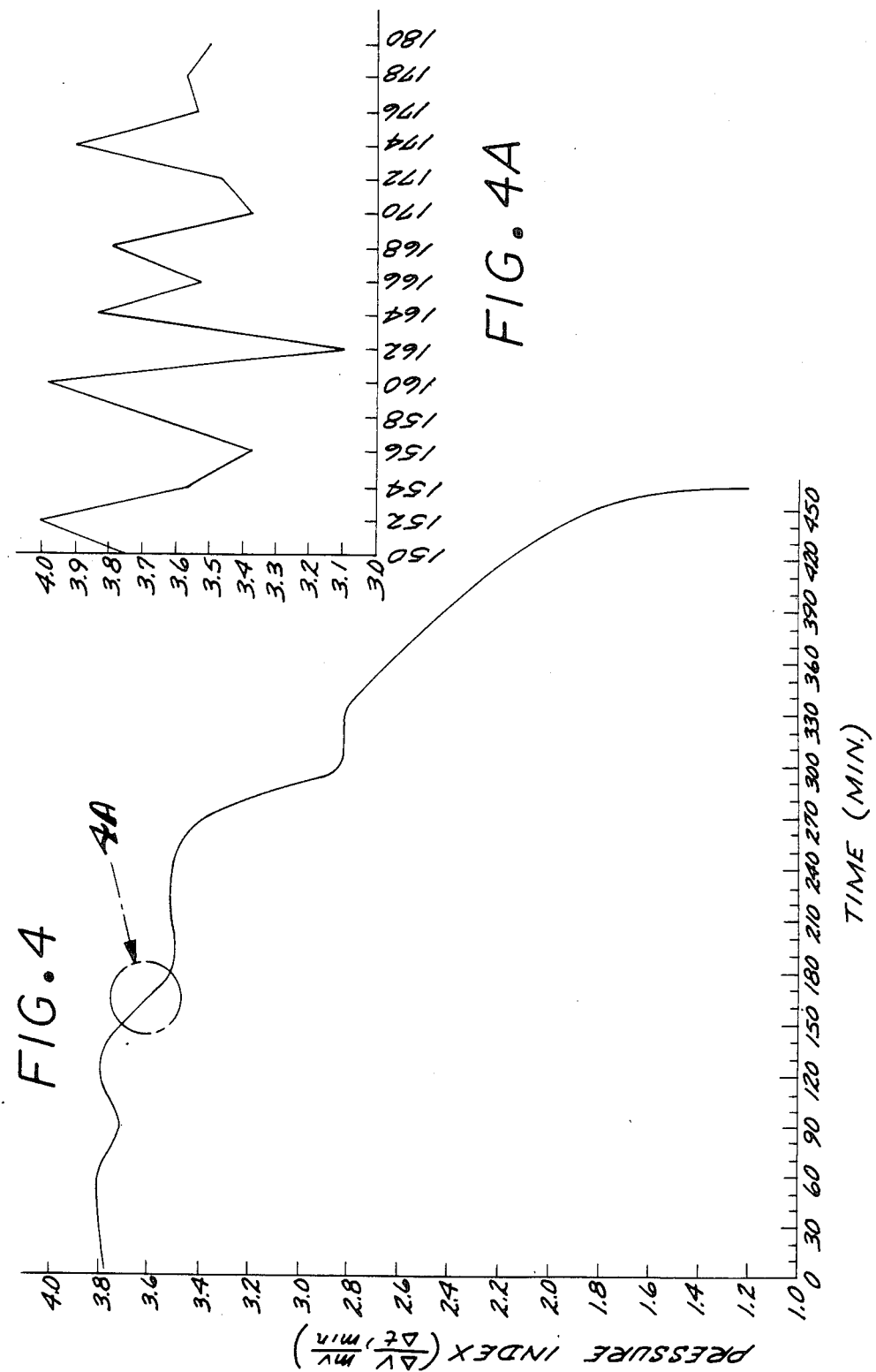
FIG. 4 is a graph of time rate of change of the gas pressure index, specifically strain gage voltage, as a function of time, for the charging depicted in FIG. 2.

FIG. 4 illustrates the time rate of change of the voltage output of the strain gauge 40 during the same test illustrated in FIG. 3, which voltage output is a measure of deformation of the wall 38 of the pressure vessel 34, which deformation is in turn a measure of the pressure within the pressure vessel 34. The voltage output of the strain gauge 40 is therefore a gas pressure index for the cell 10. If the charging conditions were varied, the curves in FIGS. 3 and 4 would change. The test of FIGS. 3 and 4 was conducted at a laboratory ambient temperature of about 20° C., but typical variations in temperature on board a spacecraft could result in changes in the curves of FIGS. 3 and 4. Some temperature effects can be compensated, but others are more difficult to correct. These effects make control of cell charging, through pressure alone, difficult without intervention by the ground controller.

Regardless of these other causes of variations in the internal pressure of the pressure vessel 34 during charging of the cell 10, it has now been determined that in all known instances the time rate of change (or slope) of the gas pressure index such as illustrated in FIG. 4 decreases to a low level as the optimum desired charge level is approached. Thus, the present invention provides that, when the time rate of change of the cell gas pressure index falls below a preselected value during the charging of the cell, charging is discontinued. The preselected value is determined by observing the optimum performance of the pressurized gas-metal cell for various charging levels or by other factors. For the nickel-hydrogen cell and test illustrated in FIGS. 1-4, a preferred preselected value is slightly less than about one-half the steady state rate of change during charging. That is, typically when the time rate of change of voltage falls below about 1.5 mv per minute, charging is discontinued. For the conditions of FIGS. 3 and 4, charging would be discontinued after approximately 460 minutes.

Although a graph such as FIG. 4 may be readily used after the fact to determine the time for discontinuing the charging, such a determination is more difficult when conducted in real time. In actual practice, the time rate of change as a function of time varies widely, due to random variation. It is therefore necessary either to filter out the noise or, preferably, to average a number of values to determine an apparent true value of the curve at a particular time.

Figure 5:
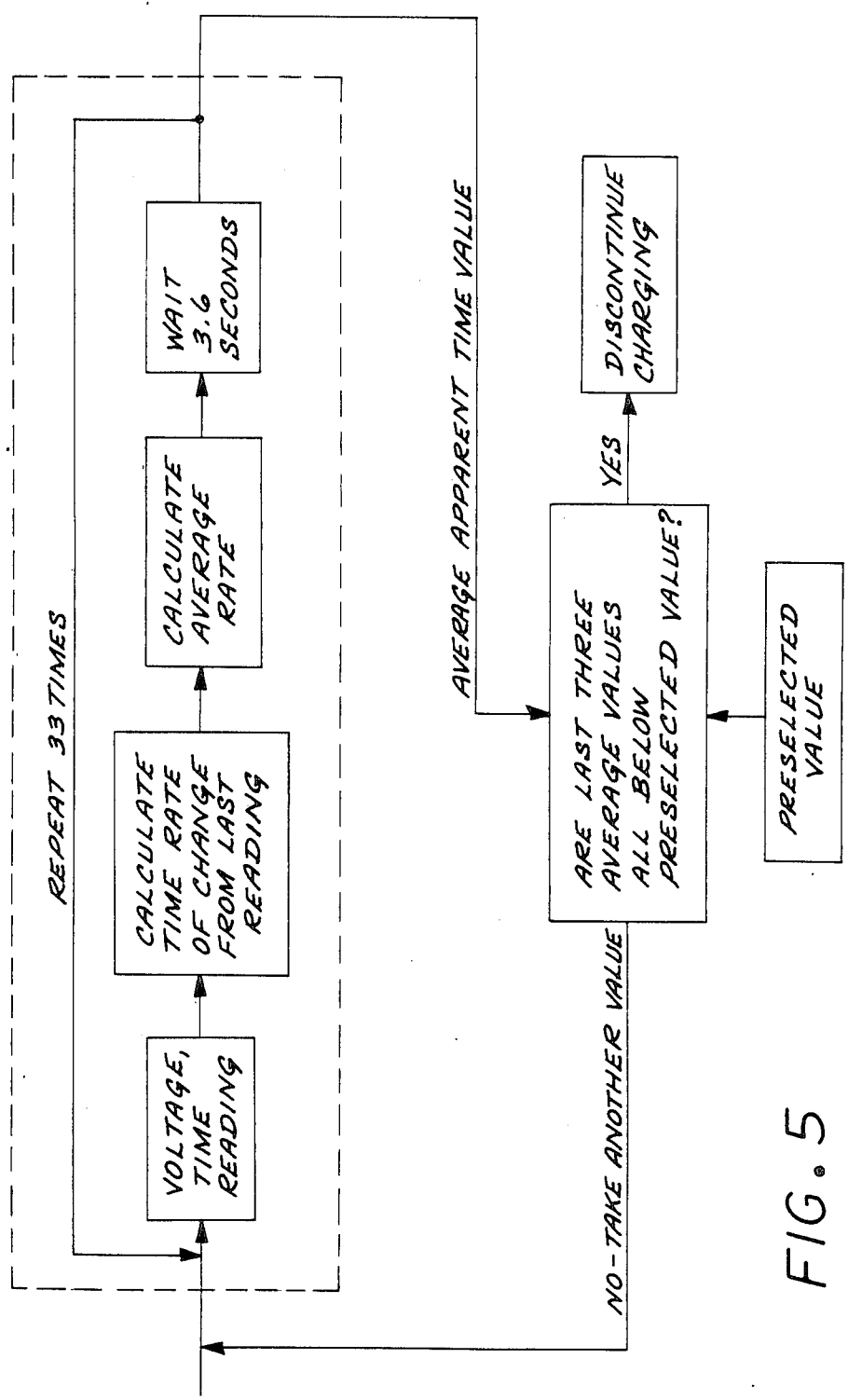
FIG. 5 is a process flow chart for calculating an averaged time rate of change of the cell pressure index.

In the presently preferred approach, the true value of the rate of change of the cell pressure index is calculated as the average of several values. FIG. 5 depicts the approach used. A value of voltage is read from the strain gauge 40, and the time of the reading is also recorded. Then the time rate of change from the last reading of voltage and time is determined. This calculation s performed by calculating the difference between the current voltage reading and the last prior voltage reading, and dividing this difference by the time interval between taking the two readings. This time rate of change can vary widely, and in the preferred approach 33 such values, each determined about 3.6 seconds apart, are averaged to obtain the average apparent true value.

The average apparent true value is compared with the preselected value, or, preferably, a set of two or more average values are each compared with the preselected value. The reason for comparing several average apparent true values with the preselected value is apparent from FIG. 4, which is the graph of the average apparent true values as a function of time. The enlarged inset FIG. 4A shows the actual data points for each 2-minute average over 33 data points. Even after averaging, the data still varies somewhat. The averaged values vary from a smooth curve through the points, and it is possible that a single averaged value might lie below the preselected value before the optimal charging is reached. Experience has shown that, where each of the last three average apparent true values is below the preselected value, there is virtually no chance that the cell will be undercharged when charging is discontinued according to this criterion. Since the averaged apparent true values are determined approximately every two minutes in this preferred approach, three values are accumulated in six minutes.

The calculations previously described have been performed using a digital computer in the presently preferred approach. For hardware to be flown in space, the calculations would preferably be performed by a microprocessor operating from an instruction set in a permanent read-only memory. The calculations may also be performed by dedicated hardware elements where the analog pressure signals are converted to digital information and processed according to a procedure such as illustrated in FIG. 5.

The controller and procedure disclosed herein have been operated in an autonomous fashion to demonstrate that no external intervention is required. A nickel-hydrogen cell has been repeatedly charged to an optimal level using the preferred approach, and then discharged. Such an approach allows the cell charging and discharging to be correctly performed even in the absence of telemetry, radio contact, and a human controller for extended periods, a requirement for certain types of satellite.

The present approach may be distinguished from the prior approach, wherein the magnitude of the gas pressure was compared with a predetermined value. In the present approach, the time rate of change of the gas pressure index is compared with a preselected value.

It will now be appreciated that, through the use of this invention, the charging of a pressurized gas-metal cell, such as a nickel-hydrogen cell, can be controlled to avoid the possibility of significantly overcharging the cell. The approach is fully compatible with existing types of such cells. Using the invention, detrimental overcharging of the cell in varying charging conditions can be avoided. Although a particular embodiment of the invention has been described in detail for purposes of illustration, various modifications may be made without departing from the spirit and scope of the invention. Accordingly, the invention is not to be limited except as by the appended claims.

What is claimed is:

1. A storage cell charging controller for use with a pressurized gas-metal storage cell, comprising:
    means for determining the rate of change of a cell gas pressure index with time; and
    means for discontinuing the charging of the cell when the rate of change falls and remains below a preselected value.

2. The controller of claim 1, wherein said cell is a nickel-hydrogen cell.

3. The controller of claim 1, wherein said means for determining includes:
    means for measuring the deformation of a component of the cell, and the deformation is the gas pressure index.

4. The controller of claim 1, wherein said means for determining includes
    a strain gauge fastened to an external wall of the cell, and the voltage output of the strain gauge is the gas pressure index.

5. The controller of claim 1, wherein said means for determining includes:
    means for measuring the gas pressure within the cell, and the gas pressure is the gas pressure index.

6. The controller of claim 1, wherein said means for discontinuing includes:
    means for calculating an averaged value of the rate of change of the cell gas pressure index.

7. The controller of claim 6, wherein said means for calculating comprises a digital computer.

8. A process for preventing the detrimental overcharging of a pressurized gas-metal cell being charged from a current source, comprising:
    determining the time rate of change of a cell gas pressure index;
    comparing the time rate of change with a preselected value; and
    discontinuing the charging of the cell when the time rate of change falls and remains below the preselected value.

9. The process of claim 8, wherein said cell is a nickel-hydrogen cell.

10. The process of claim 8, wherein the cell pressure index is gas pressure within the cell.

11. The process of claim 8, wherein the cell pressure index is deformation under pressure of a component of the cell.

12. The process of claim 8, wherein the cell pressure index is the voltage output of a strain gauge fastened to an extenral wall of the cell.

* * * * *